United States Patent
Sahrai

(10) Patent No.: US 7,896,415 B2
(45) Date of Patent: Mar. 1, 2011

(54) EASY PACKAGE LIFTING DEVICE

(76) Inventor: Mehdi M. Sahrai, Kirkland, WA (US)

( * ) Notice: Subject to any disclaimer, the term of this patent is extended or adjusted under 35 U.S.C. 154(b) by 313 days.

(21) Appl. No.: 12/287,054

(22) Filed: Oct. 3, 2008

(65) Prior Publication Data

US 2009/0096232 A1    Apr. 16, 2009

Related U.S. Application Data

(60) Provisional application No. 60/997,716, filed on Oct. 3, 2007.

(51) Int. Cl.
    *B65G 7/12*        (2006.01)
(52) U.S. Cl. ............................ 294/118; 294/119; 294/16
(58) Field of Classification Search .................... 294/11, 294/16, 50.8, 62, 118, 119, 164, 110.1
    See application file for complete search history.

(56) References Cited

U.S. PATENT DOCUMENTS

| | | | |
|---|---|---|---|
| 1,340,313 A * | 5/1920 | Zipp | ............................ 294/66.1 |
| 1,549,836 A * | 8/1925 | Hopp | ............................ 294/119 |
| 2,011,127 A | 8/1935 | Tait | |
| 2,442,698 A | 6/1948 | Lang | |
| 2,575,638 A | 11/1951 | Price | |
| 2,652,715 A | 9/1953 | Looze | |
| 3,105,715 A | 10/1963 | Happ | |
| 3,146,015 A | 8/1964 | Roberge | |
| 3,352,589 A * | 11/1967 | Kilboy et al. | .................... 294/16 |
| 3,697,117 A * | 10/1972 | Larson et al. | ................. 294/106 |
| 3,820,837 A * | 6/1974 | Fredrickson | .................... 294/16 |
| 4,055,364 A | 10/1977 | Breite | |
| 4,109,952 A | 8/1978 | Monzain | |
| 4,374,600 A | 2/1983 | Van Zelm | |
| 4,805,493 A * | 2/1989 | Stein | .............................. 81/3.44 |

* cited by examiner

*Primary Examiner* — Dean J Kramer
(74) *Attorney, Agent, or Firm* — Dean A. Craine

(57) ABSTRACT

An easy package lifting tool designed to allow a user to manually lift a package with one hand directly over the package's center of gravity that uses the weight of the package to exert inward directed forces by two gripping jaws on opposing sides of the package. The tool includes two pads pivotally attached to the distal ends of two main arms. The two main arms cross and are pivotally attached together vertically above the center axis of a line that extends between the two pads. Attached to the proximal end of the first main arm is a secondary arm. Pivotally attached to the proximal end of the second main arm is a lift arm. The distal end of the lift arm is pivotally attached to the secondary arm. Formed on the proximal end of the lift arm is a curved handle section. The location of the second pivot point between the secondary arm and the lift arm is offset from the first pivot point and the center axis of the two grippingpads. By aligning the curved handle section directly over the center axis and by using the weight of the package to generate the force needed to grasp the package, large packages are easy to lift without injury.

3 Claims, 4 Drawing Sheets

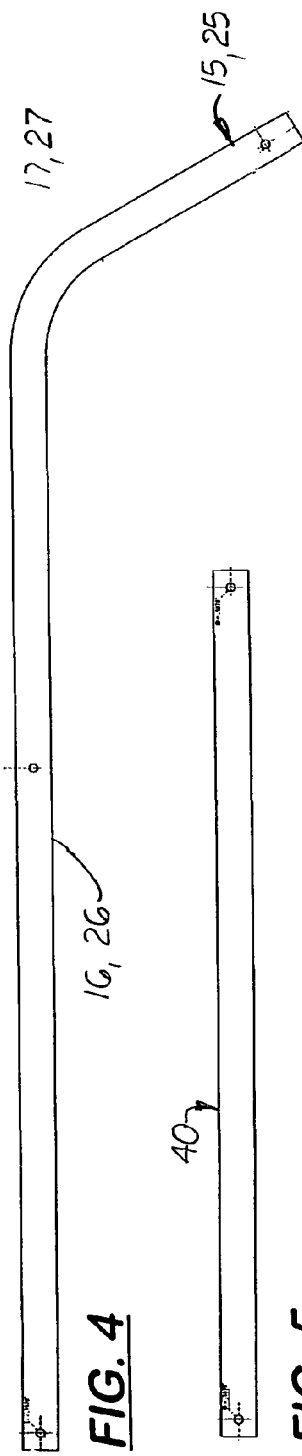
FIG. 4
FIG. 5
FIG. 6
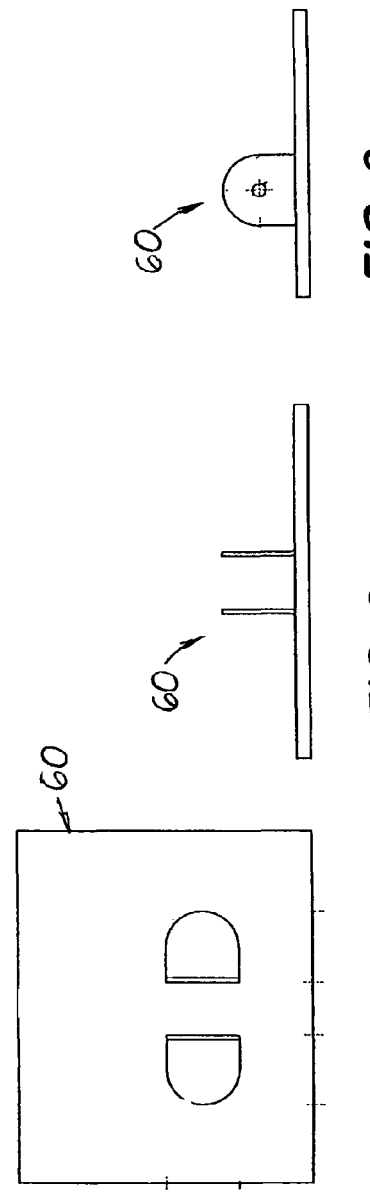
FIG. 7
FIG. 8
FIG. 9

EASY PACKAGE LIFTING DEVICE

This is a utility patent application which claims benefit of U.S. Provisional Application No. 60/997,716, filed on Oct. 3, 2007.

BACKGROUND OF THE INVENTION

1. Field of the Invention

This invention pertains to manual lifting devices, and more specifically to manual lifting devices designed to keep the force needed to vertically lift an object relatively close to the individual's center of gravity there by reducing back injuries.

2. Description of the Related Art

Lifting heavy loads (more than 20-25 kg) is a major cause of back injuries. Lifting light loads that are relatively large and difficult to handle can also cause back injuries because they force the lifting person to hold the package away from his or her center axis thereby unevenly loading and fatiguing the person's muscles and joints.

Large, oblong packages, such as planters, in which the weight is unevenly distributed and difficult to grasp can result in the package slipping and causing injuries.

Back injuries are especially troublesome in occupations that require a worker to repeatedly bend down at the waist and lift different packages.

What is needed is a lifting tool that enables a user to stand upright and manually lift a large or small package with one hand directly over the package's center of gravity and uses the weight of the package to exert equal side forces on the package so that the device does not slip when lifted.

SUMMARY OF THE INVENTION

It is an object of the present invention to provide a package lifting tool and allows the user to pickup a package while standing upright.

It is an object of the present invention to provide such a tool that reduces the amount of twisting force on the user's back when lifting.

It is another object of the present invention to provide such a tool that evenly distributes a sufficient, compression force on opposite sides of the package so that the package does not slip from the tool.

These and other objects of the invention are met by the easy package lifting tool disclosed herein designed to allow a user to manually lift a lightweight package while standing using one hand located directly over the package's center of gravity. The tool partially uses the weight of the object to exert an inward directed force on opposite sides of the package thereby reducing fatigue and the amount to twisting force exerted on the person's spine and muscles.

The tool is an elongated structure that allows a user to stand upright and lift a package off the floor. The tool includes two pivotally attached main arms. The two main arms are equal in length and include a straight segment and a curved segment that is substantially perpendicular to the straight segment. When the two main arms are pivotally attached together, the two curved segments are directed inward.

Attached to the ends of the two curved segments are two pivotally attached gripping pads. During use, the two gripping pads automatically tilt and adjust to conform to the adjacent surface of the package.

The two main arms are pivotally attached at a first pivot joint located vertically above the mid-line axis between the two pads when the tool is held upright. The proximal ends of the two main arms extend outward beyond the curved segment of the opposite main arm when the two gripping pads are pressed together. Attached to the proximal end of the first main arm is a long, straight secondary arm. The secondary arm is sufficient in length to extend over the first pivot joint.

Pivotally attached to the distal end of the second main arm is a lift arm. The lift arm extends upward and crosses and pivotally attaches to the upper section of the secondary arm that extends beyond the tool's center axis. The lift arm includes a curve handle section that bends downward towards an optional foam or rubber handle attached to the secondary arm. The curve handle section is integrally formed on the lift arm so that the user is able to selectively press the secondary arm and the curved handle together and spread the two gripping pads apart so that this may be positioned around a package. When the curved handle is released and an upward force is exerted on the handle by the user, the two main arms pivot inward forcing the two gripping pads together on opposite sides of the package. The package can then be safely lifted.

A key feature of the lifting device is that because the first pivot joint between the two main arms and the location of the curve handle section are positioned over the package's center axis and because the lift arm is pivotally connected at its opposite ends to the first main arm and the secondary arm, the lifting force is always aligned with the package's center axis. Another key feature is that a portion of the weight of the package produces the force needed to grasp the package, thereby reducing fatigue. Another key feature is that the gripping packs are able to pivot on the end of the main arm thereby allowing the device to lift a wide variety of different shape packages.

DESCRIPTION OF THE DRAWINGS

FIG. 4 is a side elevational view of a main arm.
FIG. 5 is a side elevational view of the secondary arm.
FIG. 6 is a side elevational view of the lift arm.
FIG. 7 is a front elevational view of a gripping member.
FIG. 8 is a top plan view of a gripping member.
FIG. 9 is a side elevational view of a gripping member.

DESCRIPTION OF THE PREFERRED EMBODIMENT(S)

Figure 1:
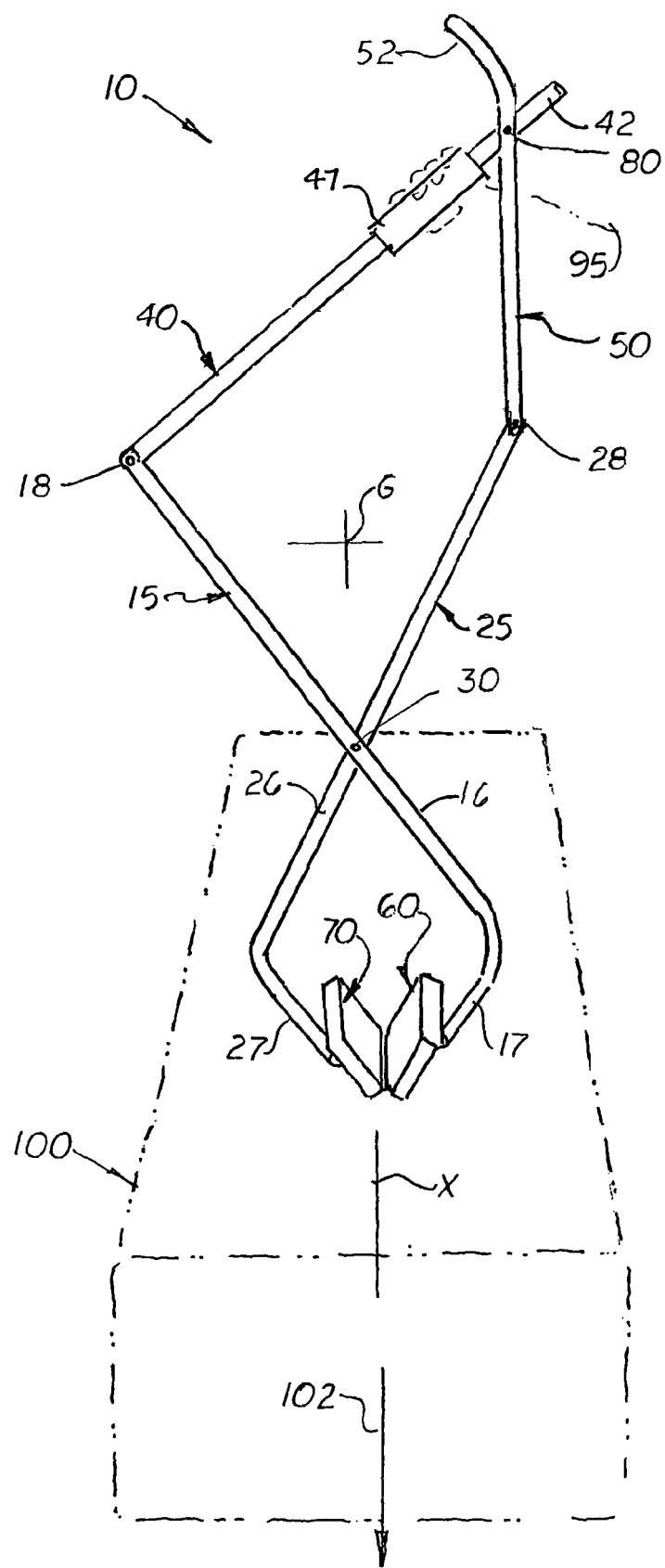
FIG. 1 is an illustration showing the package lifting tool in a collapsed configuration and vertically aligned above a large package to be lifted.

Referring to the FIGS. 1-9, there is shown an easy package lifting tool 10 designed to allow a user to manually lift (lifting force denoted as f1) a package 100 while standing upright. The tool 10 allows the user to use one hand 95 which is positioned substantially over the package's center of gravity 102 thereby reduce the amount of torque exerted on the user's back muscles when lifting. The tool 10 is also designed to use the weight of the package 10 to produce two equally inward directed forces (denoted f2 and f3 in FIG. 3) on the opposite sides of a package 100.

The tool 10 includes two pivotally attached L-shaped main arms 15, 25. The two main arms 15, 25 are equal in length and include a straight segment 16, 26, and a curved segment 17, 27, respectively. The curved segments 17, 27 are substantially perpendicular to the straight segments, 16, 26, respectively. When the two main arms 15, 25 are pivotally attached together, the two curved segments 17, 27 are directed inward.

The tool 10 includes two gripping pads 60, 70 pivotally attached to the distal ends of two curved segments 17, 27, respectively. When assembled, the two curved segments 17, 27 extend downward and the two gripping pads 60, 70 are vertically aligned and face inward. The two main arms 15, 25 cross and are pivotally connected together at a first pivot joint 30 located at a point slightly lower than main arm's center axis (denoted G). The first pivot joint 30 is located directly above the mid-line axis of a line X that extends between the two gripping pads 60, 70.

The two straight sections 16, 26 are sufficient in length so that the proximal ends 18, 28 of the two straight sections 16, 26, extend outward slightly outside the two gripping pads 60, 70. Attached to the proximal end 18 of the first main arm 15 is a long straight secondary arm 40. The secondary arm 40 is sufficient in length to extend over the first pivot joint 30 used to hold the two main arms 15, 25 together when diagonally aligned. Attached to the secondary arm 40 is a foam or rubber handle 47.

Figure 2:
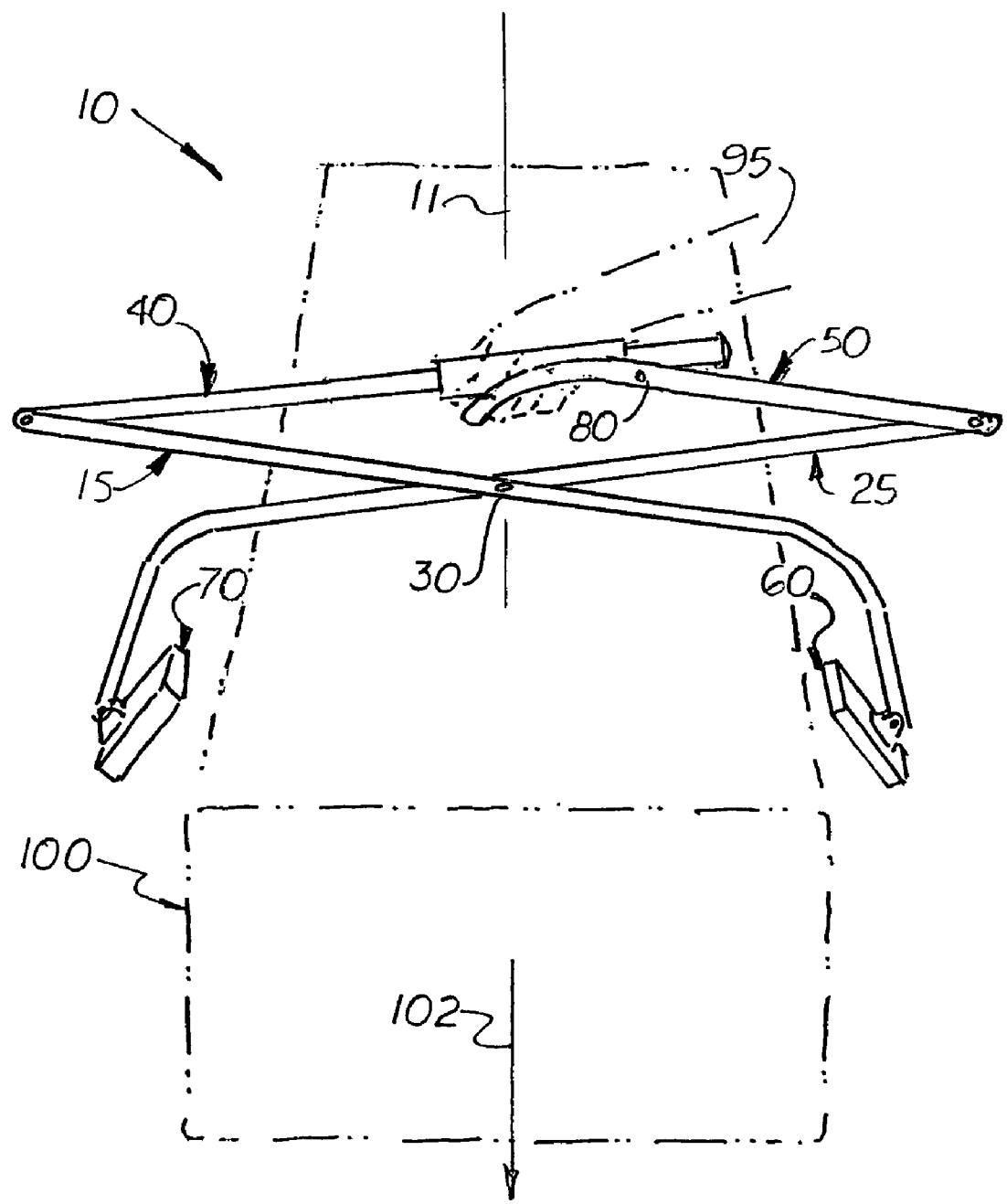
FIG. 2 is an illustration similar to FIG. 1 showing the package lifting tool in an expanded configuration by the hand of the user so that the two gripping members are positioned on opposite sides of the package.
Figure 3:
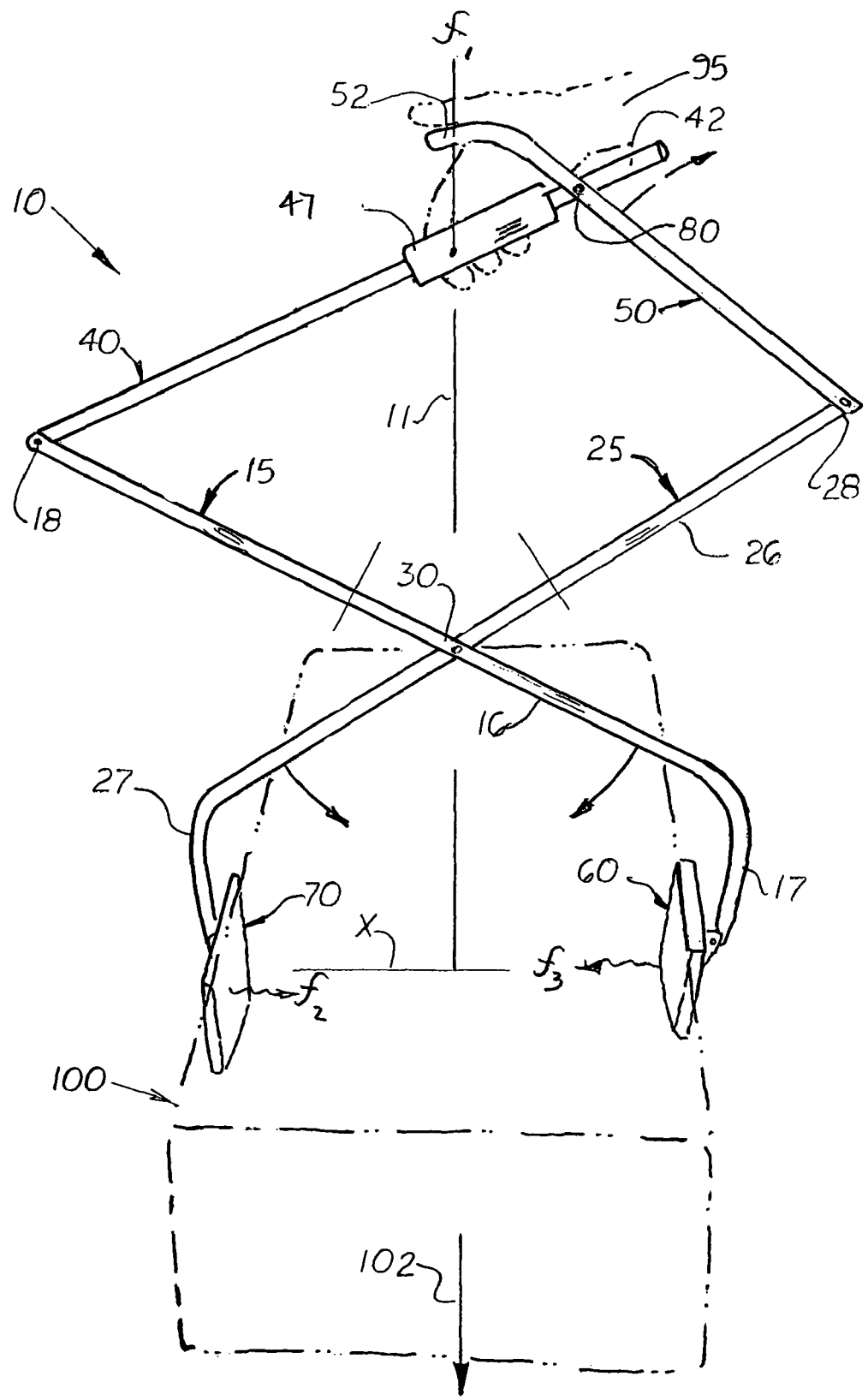
FIG. 3 is an illustration showing the package lifting tool shown in FIGS. 1 and 2 showing the user releasing the handle and applying an upward lifting force of the handle on the secondary arm so that the two gripping members apply an inward directed force on opposite sides of the package so that the user may lift the package.

Pivotally attached to the distal end 28 of the second main arm 25 is a lift arm 50. The lift arm 50 extends upward and crosses and pivotally attaches to the section 42 of the secondary arm 40 that extends beyond the tool's center axis 11 and the first pivot joint 30. The lift arm 50 includes a curve handle 52 that bends downward towards an optional handle 47 attached to the secondary arm 40. The curve handle 52 is located on the lift arm 50 so that the user is able to selectively press the secondary ami 40 and said curved handle 52 together to open the two gripping pads as shown in FIG. 2 so the tool 10 may be placed around a package 100. When the curved handle 52 is released as shown in FIG. 3, an upward force (fl) is exerted on the handle 52, the distal ends of the two main arms 15, 25 pivots inward forcing the two gripping pads 60, 70 together on opposite sides of the package 100. The package 100 can then be safely lifted.

An important aspect of the tool 10 is the location of the second pivot point 80 between the secondary arm 40 and the lift arm 50 that is offset from the first pivot point 30 and the tool's center axis 11. When the user's hand 95 is placed on the handle 47 on the secondary arm 40, the thumb is able to extend over the curve portion 52 of the lift arm 50. Simultaneously, the lifting force (f1) exerted by the user on the handle 47 is directly above the center axis 11. By aligning the hand 95 directly over the center axis 11 and by using the weight of the package 100 to generate the two inward extending forces on the opposite sides of the package 100.

In the preferred embodiment, the two main arms 15, 25, the secondary arm 40 and the lift arm 50 are made of aluminum, tubular material.

In compliance with the statute, the invention described herein has been described in language more or less specific as to structural features. It should be understood however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A package lifting tool, comprising:
    a. two L-shaped main arms each including a lower curved segment and an upper straight segment, said main arms being pivotally connected together at a first pivot joint, each said main arm including a distal end and a proximal end;
    b. one gripping pad pivotally attached to said distal end of each said main arm, said gripping pads each including a flat surface designed to be press against the opposite surfaces of an object so that the object may be manually lifted;
    c. a secondary arm pivotally attached to the proximal end of one said main arm, said secondary arm being sufficient in length to extend over and beyond said first pivot joint to pivotally hold said two main arms together; and,
    d. lift arm pivotally attached at one end to the proximal end of said main arm opposite said main arm attached to said secondary arm, said lift arm extending upward and crossing the section of said secondary arm extending beyond said first pivot joint, said lift arm being pivotally attached to the upper section of said secondary arm that extends over said first pivot joint, said lift arm including a curve handle surface that extends inward to enable a user to selectively press said secondary arm and said curved handle together to open said gripping pads or hold said secondary and simultaneously release said lift arm so that said main arms may move inward on opposite sides of a package disposed between said gripping pads and lift said package when a upward force is applied to said secondary arm.

2. The package lifting tool, as recited in claim 1, further including a handle attached to said secondary arm.

3. A method for manually lifting a package, comprising the following steps:
    a. selecting a package lifting tool that includes:
        two L-shaped main arms each including a lower curved segment and an upper straight segment, said main arms being pivotally connected together at a first pivot joint, each said main arm including a distal end and a proximal end;
        one gripping pad pivotally attached to said distal end of each said main arm, said gripping pads each including a flat surface designed to be press against the opposite surfaces of an object so that the object may be manually lifted;
        a secondary arm pivotally attached to the proximal end of one said main arm, said secondary arm being sufficient in length to extend over and beyond said first pivot joint to pivotally hold said two main arms together; and,
        a lift arm pivotally attached at one end to the proximal end of said main arm opposite said main arm attached to said secondary arm, said lift arm extending upward and crossing the section of said secondary arm extending over said first pivot joint, said lift arm being pivotally attached to the upper section of said secondary arm that extends over said first pivot joint, said lift arm including a curve handle surface that extends inward to enable a user to selectively press said secondary arm and said curved handle together to open said gripping pads or hold said secondary arm and simultaneously release said lift arm so that said main aims may move inward on opposite sides of a package disposed between said gripping pads and lift said package when a upward force is applied to said secondary arm;

b. vertically holding said package lifting tool above a package to be vertically lifted so that said first pivot joint is centrally aligned over said package;

c. gripping said secondary arm and said curve handle together so that said gripping pads are spread apart a sufficient distance so that they may be positioned on opposite sides of the package; and;

d. release said lifting arm and apply an upward force to said secondary arm so that said gripping pads press inward against the sides of said package and said package may be vertically lifted.

* * * * *